United States Patent Office 3,445,337
Patented May 20, 1969

3,445,337
YEAST FERMENTATION PROCESS
John Francis Theodore Spencer, Alexander Patrick Tulloch, and Philip Albert James Gorin, Saskatoon, Saskatchewan, Canada, assignors to Canadian Patents and Development Limited, Ottawa, Ontario, Canada, a corporation of Canada
No Drawing. Filed Sept. 30, 1966, Ser. No. 583,477
Int. Cl. C12c *11/00;* C12d *13/00*
U.S. Cl. 195—37                                11 Claims

ABSTRACT OF THE DISCLOSURE

Hydroxy fatty acids are produced as glycolipids by fermenting strains of the osmophilic yeast *Torulopsis apicola*. Various aliphatic long chain compounds are desirably added to the medium to effect conversion thereof to hydroxy fatty acid glycoside. Suitable compounds include fatty acids and esters, hydrocarbons and alcohols.

---

This invention relates particularly to hydroxy fatty acids and their production as glycolipids by a fermentation process. Strains of the osmophilic yeast *Torulopsis apicola* have been found to produce glycosides of the disacchride sophorose and hydroxy fatty acids from various substrate. Sophorosides of fatty alcohols may also be produced in certain instances.

In United States Patent No. 3,205,150 issued Sept. 17, 1965 (and continuation-in-part application Ser. No. 440,603 filed Mar. 17, 1965 now Patent No. 3,312,684), a similar fermentation process is described using strains of the yeast *Torulopsis magnoliae*. The production of the glycoside using substrate containing long chain aliphatic compounds and the separation and recovery of the hydroxy fatty acids are described in U.S. Patent No. 3,205,150 (and continuation-in-part application S.N. 440,603). (The disclosures of this patent and application are incorporated herein by reference.) The hydroxyl group is always introduced near the end of the chain remote from the carboxyl group, normally in the omega or omega minus one position.

It has now been found that strains of the yeast *Torulopsis apicola* effect conversions to similar hydroxy fatty acid glycolipid. The species *T. apicola* has been described in a paper by Hajsig in Antonie van Leeuwenhoek 24, 18–22 (1958). Several strains have been isolated from flowers in the Saskatoon, Saskatchewan area. A number of other strains were isolated from bumblebee nests in the Pincher Creek area of Alberta and near Melfort, Saskatchewan. Strains designated 62–133, 62–134, 62–134a, 62–140 and 62–141, isolated from flowers in the Saskatoon area, have been deposited in the culture collection at the University of California at Davis. All of the above strains have been found effective in producing the glycolipid, with very little difference in yields being observed. The strains may be isolated and tested in a manner similar to that described in U.S. Patent No. 3,205,150. Other fatty acid- or hydroxy fatty acid-producing strains than those specifically designated may be used.

The strains are grown in aerated culture on a medium comprising a fermentable sugar and a nitrogen source. The temperature may range from about 20 to about 35° C. The pH of the medium is preferably about 3.5 to about 4.5. Generally the conditions are the same as for *T. magnoliae*.

Various aliphatic long chain compounds are desirably added to the medium to effect conversion thereof to hydroxy fatty acid glycoside. Suitable aliphatic compounds include fatty acids and esters thereof (including unsaturated fatty acids), hydrocarbons (saturated or unsaturated), and alcohols. It is particularly economical to add mixtures such as mineral oil or fraction thereof, vegetable oil, tall oil acids and esters thereof, animal fat, crude gas oil and waxes especially hydrocarbon waxes. Compounds having 16 to 23 or above carbon atoms form only water-insoluble glycoside; $C_{12}$ to $C_{15}$ form a similar insoluble glycoside but may also, on occasion, form water-soluble glycolipid in addition. The water-insoluble glycolipid is readily separated from the medium and the water-soluble glycolipid can be recovered by, for instance, solvent extraction or distillation. In addition to the additives mentioned in U.S. Patent No. 3,205,150 and continuation-in-part application S.N. 440,603, other additives such as lauryl alcohol, myristyl alcohol, animal fats, hydrocarbon wax, castor oil, sunflower oil, heptadecane, oleyl alcohol and methyl palmitoleate have been successfully utilized. The manner of addition and concentration of aliphatic compound, the fermentation conditions, and the product recovery are generally similar to those in U.S. Patent No. 3,205,150 and continuation-in-part application S.N. 440,603. High melting fats and waxes may be dissolved in a solvent (which is not itself attacked by the yeast), to increase the yields from these materials. The yeast preferentially uses the $C_{15}$ to $C_{23}$ straight chain hydrocarbons in a crude refinery gas oil and leaves the rest of the oil untouched. In many cases the residual oil is improved in pour point and certain other properties.

The recovered glycolipid may be used directly as lubricant, plasticizer, surfactant, etc. or deactylated and hydrolyzed to free the hydroxy fatty acid and the sophorose. Enzymatic hydrolysis may be used to give good recoveries of sophorose, which may be recycled. Further detail on the glycoside products is given in United States application S.N. 440,603.

The following examples illustrate the invention.

Example 1

A medium containing glucose 10%, yeast extract 0.8% and urea 0.1% was made up to a volume of 3 litres in a 5 litre stirred fermentor. The medium was inoculated with 50 ml. of a 48-hour culture of *Torulopsis apicola*, grown in shaken culture in a similar medium. The fermentor was operated at 385 r.p.m., air flow rate 1 litre/min. and temperature 25° C. After 24 hours the addition of n-heptadecane 20 g./day was started and continued for 4 days so that a total of 80 g. n-heptadecane was added. The final yield was 115 g. of partly dewatered material which was recovered by heating the culture to melt the product and then allowing it to settle. Percent conversion to hydroxy fatty acid was 50–60%.

Example 2

The culture conditions were as in Example 1. Hydrocarbon wax was melted and added at the rate of 35 g./day. After 3 additions (105 g.) the yield was 6% by volume of glycolipid, corresponding to a percent conversion of wax to hydroxy fatty acids of about 45%.

Example 3

The culture conditions were as in Example 1, except that the fermentation temperature was 22° C. Sunflower oil was added at the rate of 30 g./day. After 5 additions the percentage conversion to hydroxy fatty acids was approximately 67%.

Example 4

This example was similar to Example 3 except that tallow was used. The final percent conversion to hydroxy fatty acids was about 63%.

Example 5

A 500 ml. Erlenmeyer flask containing 50 ml. of medium including 10% glycose, 0.8% yeast extract and 0.1% urea, was inoculated with *T. apicola* and incubated at 25° C. on a rotary shaker at 230 r.p.m. After 24 hours, 0.5 g. of methyl palmitoleate was added in the form of an emulsion in 10 ml. of water. The culture was incubated for a further three days at the same temperature and rate of shaking, after which time 1.7 ml. of crude glycolipid, corresponding to a conversion rate of 80%, was recovered.

Similar results were obtained when methyl oleate or oleyl alcohol were used instead of the methyl palmitoleate.

In the above examples the glycolipid obtained was the same as that obtained with equivalent fermentations using *T. magnoliae*.

Example 6

With the cultural conditions as in Example 5, myristyl alcohol ($C_{14}OH$) was added in two 0.5 g. additions to each of two flasks. After four days' fermentation no oil was apparent in the bottom of the flasks. However, on extracting the total fermentation medium (about 100 ml.) with ethyl acetate, 1.173 g. oil glycoside was obtained which was water-soluble.

It has been observed that when primary alcohols are fed to the medium, about 30–40% or more (depending on the fermentation conditions) of the alcohol is converted directly (without hydroxylation) to glycolipid. This fatty alcohol-sophorose glycolipid (no hydroxyl, carboxyl, or polar group at the end of the long chain) is useful as a non-ionic surface active agent.

Example 7

With the cultural conditions as in Example 5, one g. of oleyl alcohol was added to the medium and after the fermentation was completed 1.816 g. (dry weight) of water-insoluble oil (containing no unreacted alcohol) was obtained. Hydrolysis of the oil glycoside (hydrochloric acid-methanol) gave about 30% oleyl alcohol and 70% 17-hydroxy oleate. The 17-hydroxy oleate sophoroside is present as lactone.

We claim:

1. A method comprising fermenting a substrate with a fatty acid-producing strain of *Torulopsis apicola*, and recovering the glycoside produced.
2. A method comprising fermenting a substrate containing a sugar and nitrogen source with a fatty acid-producing strain of *Torulopsis apicola*, adding an aliphatic compound having at least 12 straight chain carbon atoms in the molecule to the medium, and recovering the fatty acid glycoside produced.
3. A method comprising fermenting a substrate containing a sugar and nitrogen source with a hydroxy fatty acid-producing strain of *Torulopsis apicola*, adding an aliphatic $C_{15}$ to $C_{23}$ compound to the medium, and recovering the fatty acid-glycoside produced.
4. The method of claim 1 wherein a mineral oil or fraction thereof is added to the fermenting medium.
5. The method of claim 1 wherein a vegetable oil or fraction thereof is added to the fermenting medium.
6. The method of claim 1 wherein tall oil acids or esters thereof are added to the fermenting medium.
7. The method of claim 1 wherein an animal fat or fraction thereof is added to the fermenting medium.
8. The method of claim 1 wherein a crude gas oil is added to the fermenting medium.
9. The method of claim 1 wherein a primary alcohol is added to the fermenting medium.
10. The method of claim 1 wherein a hydrocarbon wax is added to the fermenting medium.
11. The method of claim 1 wherein the glycoside is subjected to deacetylation and hydrolysis, and at least one of the fatty acid and the sophorose recovered.

References Cited

UNITED STATES PATENTS 3,205,150  9/1965  Spencer _____ 195—30

LIONEL M. SHAPIRO, *Primary Examiner.*

U.S. Cl. X.R.

195—30